United States Patent
Li et al.

(10) Patent No.: US 10,628,984 B2
(45) Date of Patent: Apr. 21, 2020

(54) FACIAL MODEL EDITING METHOD AND APPARATUS

(71) Applicant: TENCENT TECHNOLOGY (SHENZHEN) COMPANY LIMITED, Shenzhen (CN)

(72) Inventors: Xiaomeng Li, Shenzhen (CN); Qiang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/111,922

(22) Filed: Aug. 24, 2018

(65) Prior Publication Data
US 2018/0365878 A1 Dec. 20, 2018

Related U.S. Application Data

(63) Continuation of application No. PCT/CN2017/076029, filed on Mar. 9, 2017.

(30) Foreign Application Priority Data

Mar. 10, 2016 (CN) .......................... 2016 1 0136300

(51) Int. Cl.
*G06T 11/60* (2006.01)
*G06T 19/20* (2011.01)
(Continued)

(52) U.S. Cl.
CPC .......... *G06T 11/60* (2013.01); *G06F 3/04812* (2013.01); *G06F 3/04842* (2013.01);
(Continued)

(58) Field of Classification Search
None
See application file for complete search history.

(56) References Cited

U.S. PATENT DOCUMENTS 5,825,941 A 10/1998 Linford et al.
6,362,829 B1 3/2002 Omvik et al.
(Continued)

FOREIGN PATENT DOCUMENTS

CN 1300996 A 6/2001
CN 1545068 A 11/2004
(Continued)

OTHER PUBLICATIONS

The World Intellectual Property Organization (WIPO) International Search Report for PCT/CN2017/076029 dated Jun. 12, 2017 6 Pages (including translation).
(Continued)

*Primary Examiner* — YuJang Tswei
(74) *Attorney, Agent, or Firm* — Anova Law Group, PLLC

(57) ABSTRACT

A facial model editing method and apparatus are provided. The method includes detecting a location of a cursor in a facial model displayed on a screen. The facial model containing a plurality of facial positions. The method also includes determining a to-be-operated facial position from the plurality of facial positions according to the location of the cursor; and detecting a selection operation on the to-be-operated facial position. Further, the method includes editing the to-be-operated facial position in response to an obtained editing operation on the to-be-operated facial position; and displaying the edited to-be-operated facial position in the facial model.

14 Claims, 6 Drawing Sheets

(51) Int. Cl.
  *G06T 7/73* (2017.01)
  *G06F 3/0481* (2013.01)
  *G06F 3/0484* (2013.01)
(52) U.S. Cl.
  CPC ............ *G06F 3/04845* (2013.01); *G06T 7/75* (2017.01); *G06T 19/20* (2013.01); *G06T 2207/30201* (2013.01); *G06T 2210/22* (2013.01); *G06T 2219/2012* (2013.01)

(56) References Cited

U.S. PATENT DOCUMENTS

| | | | | |
|---|---|---|---|---|
| 7,593,603 | B1* | 9/2009 | Wilensky | G06T 5/00 358/1.2 |
| 8,265,351 | B2* | 9/2012 | Aarabi | G06K 9/00234 382/118 |
| 9,058,765 | B1* | 6/2015 | Mallick | G06F 3/0482 |
| 9,747,716 | B1* | 8/2017 | Mallet | G06T 13/40 |
| 2008/0267443 | A1 | 10/2008 | Aarabi | |
| 2015/0012884 | A1* | 1/2015 | Hayasaka | G06F 3/0482 715/811 |
| 2018/0197273 | A1* | 7/2018 | Hung | G06K 9/00281 |
| 2018/0225882 | A1* | 8/2018 | Varanasi | G06T 7/337 |
| 2019/0035149 | A1* | 1/2019 | Chen | G06T 17/20 |

FOREIGN PATENT DOCUMENTS

| | | |
|---|---|---|
| CN | 101021943 A | 8/2007 |
| CN | 102834843 A | 12/2012 |
| CN | 102999929 A | 3/2013 |
| CN | 103207745 A | 7/2013 |
| CN | 103392180 A | 11/2013 |
| CN | 104103090 A | 10/2014 |
| CN | 104156912 A | 11/2014 |
| CN | 104380339 A | 2/2015 |
| CN | 104616330 A | 5/2015 |
| CN | 105389835 A | 3/2016 |
| JP | H09245162 A | 9/1997 |
| JP | H11503540 A | 3/1999 |
| JP | 2012004719 A | 1/2012 |
| JP | 2015014861 A | 1/2015 |
| KR | 20150005436 A | 1/2015 |

OTHER PUBLICATIONS

The State Intellectual Property Office of the People's Republic of China (SIPO) Office Action 1 for 201610136300.1 dated Nov. 5, 2018 11 Pages (including translation).
The State Intellectual Property Office of the People's Republic of China (SIPO) Office Action 2 for 201610136300.1 dated Jan. 23, 2019 8 Pages (including translation).
Mengran Wang, "The era of "face"", Computer Enthusiast, vol. 2014, No. 16, Dec. 31, 2014 2 Pages.
Korean Intellectual Property Office (KIPO) Office Action 1 for 20187025694 dated Aug. 30, 2019 9 Pages (including translation).
The Japan Patent Office (JPO) Notification of Reasons for Refusal for Application No. 2018-545644 and Translation dated Oct. 1, 2019 8 Pages.

* cited by examiner

FACIAL MODEL EDITING METHOD AND APPARATUS

RELATED APPLICATION

This application is a continuation application of PCT Patent Application No. PCT/CN2017/076029, filed on Mar. 9, 2017, which claims priority to Chinese Patent Application No. 201610136300.1, entitled "FACIAL MODEL EDITING METHOD AND APPARATUS" filed with the Patent Office of China on Mar. 10, 2016, which is incorporated by reference in its entirety.

FIELD OF TECHNOLOGY

This application relates to the computer technology field and, specifically, to a facial model editing method and apparatus.

BACKGROUND

Currently, a conventional facial model editing process is usually implemented by adjusting locations of different sliding blocks in progress bars on a controller. For example, when an eye position in a facial model is edited, it is often required that, in a quite-long control-list corresponding to the eye position, locations of different sliding blocks in progress bars are sequentially dragged and adjusted, thereby completing all editing on the eye position. In this way, a player not only needs to ensure that the sliding block selected by the cursor corresponds to the position to be adjusted, but also needs to confirm an actual changing effect of the face in the editing process.

That is, using the conventional facial model editing method, the user's eyes need to switch continuously between the face and the sliding blocks. The editing process is not intuitional, and editing operations are cumbersome, increasing operation complexity and development difficulty.

The disclosed methods and systems are directed to solve one or more problems set forth above and other problems.

SUMMARY

Embodiments of this application provide a facial model editing method and apparatus, so as to resolve at least a technical problem of relatively high complexity of an editing operation caused due to use of a conventional facial model editing method.

According to an aspect of the embodiments of this application, a facial model editing method is provided. The method includes detecting a location of a cursor in a facial model displayed on a screen. The facial model containing a plurality of facial positions. The method also includes determining a to-be-operated facial position from the plurality of facial positions according to the location of the cursor; and detecting a selection operation on the to-be-operated facial position. Further, the method includes editing the to-be-operated facial position in response to an obtained editing operation on the to-be-operated facial position; and displaying the edited to-be-operated facial position in the facial model.

According to another aspect of the embodiments of this application, a facial model editing apparatus is further provided. The apparatus includes a memory storing computer program instructions; and a processor coupled to the memory. When executing the computer program instructions, the processor is configured to perform: detecting a location of a cursor in a facial model displayed on a screen, the facial model containing a plurality of facial positions; determining a to-be-operated facial position from the plurality of facial positions according to the location of the cursor; detecting a selection operation on the to-be-operated facial position; editing the to-be-operated facial position in response to an obtained editing operation on the to-be-operated facial position; and displaying the edited to-be-operated facial position in the facial model.

According to another aspect of the embodiments of this application, a non-transitory computer-readable storage medium is further provided. The non-transitory computer-readable storage medium stores computer program instructions executable by at least one processor to perform: detecting a location of a cursor in a facial model displayed on a screen, the facial model containing a plurality of facial positions; determining a to-be-operated facial position from the plurality of facial positions according to the location of the cursor; detecting a selection operation on the to-be-operated facial position; editing the to-be-operated facial position in response to an obtained editing operation on the to-be-operated facial position; and displaying the edited to-be-operated facial position in the facial model.

Other aspects of the present disclosure can be understood by those skilled in the art in light of the description, the claims, and the drawings of the present disclosure.

BRIEF DESCRIPTION OF THE DRAWINGS

Accompanying drawings described herein are used to facilitate understanding of the present disclosure, and constitute one portion of the present disclosure; and schematic embodiments and their description are used to illustrate the present disclosure and do not constitute an inappropriate limitation on the present disclosure.

DETAILED DESCRIPTION

To facilitate a person skilled in the art to understand the solutions in the present disclosure, the following describes the technical solutions in the embodiments of the present disclosure with reference to the accompanying drawings. Apparently, the described embodiments are merely some but not all of the embodiments of the present disclosure. All other embodiments obtained by a person skilled in the art based on the disclosed embodiments of the present application without creative efforts shall fall within the protection scope of the present application.

The specification and claims of the present disclosure, and terms "first" and "second" in the foregoing accompanying drawings are used to distinguish similar objects, but are unnecessarily used to describe a specific sequence or order. It should be understood that, data used in this way can be interchanged in an appropriate case, so that the embodiments of the present disclosure that are described herein can be implemented in a sequence other than those sequences illustrated or described herein. In addition, terms "include" and "have" and any of their variations are intended to cover nonexclusive including, for example, a process, method, system, product, or device that includes a series of steps or units does not have to be limited to those clearly listed steps or units, but may include another step or unit that is not clearly listed or is inherent to the process, method, product, or device.

Figure 1:
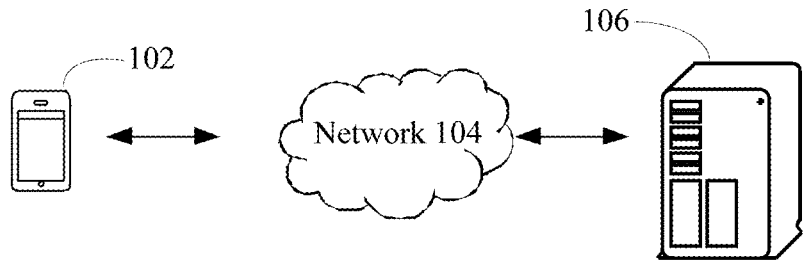
FIG. 1 is a schematic diagram of an application environment of a facial model editing method according to an embodiment of the present disclosure.

According to the embodiments of the present disclosure, an embodiment of a facial model editing method is provided, and the facial model editing method may be applied to, but not limited to, an application environment shown in FIG. 1.

As shown in FIG. 1, the application environment includes a terminal 102, a server 106, and a network 104 coupling the terminal 102 and server 106. In operation, after the terminal 102 obtains a facial model from the server 106 through the network 104, a location of a cursor in a facial model displayed in the terminal 102 is detected, and the displayed facial model includes a plurality of facial positions. Further, a to-be-operated facial position of the plurality of facial positions is determined according to the location and, after a selection operation on the to-be-operated facial position is detected, the to-be-operated facial position is edited in response to an obtained editing operation on the to-be-operated facial position. Further, the edited to-be-operated facial position is displayed in the facial model. In one embodiment, the terminal may include, but is not limited to, at least one of the following: a mobile phone, a tablet computer, a notebook computer, and a PC.

Figure 2:
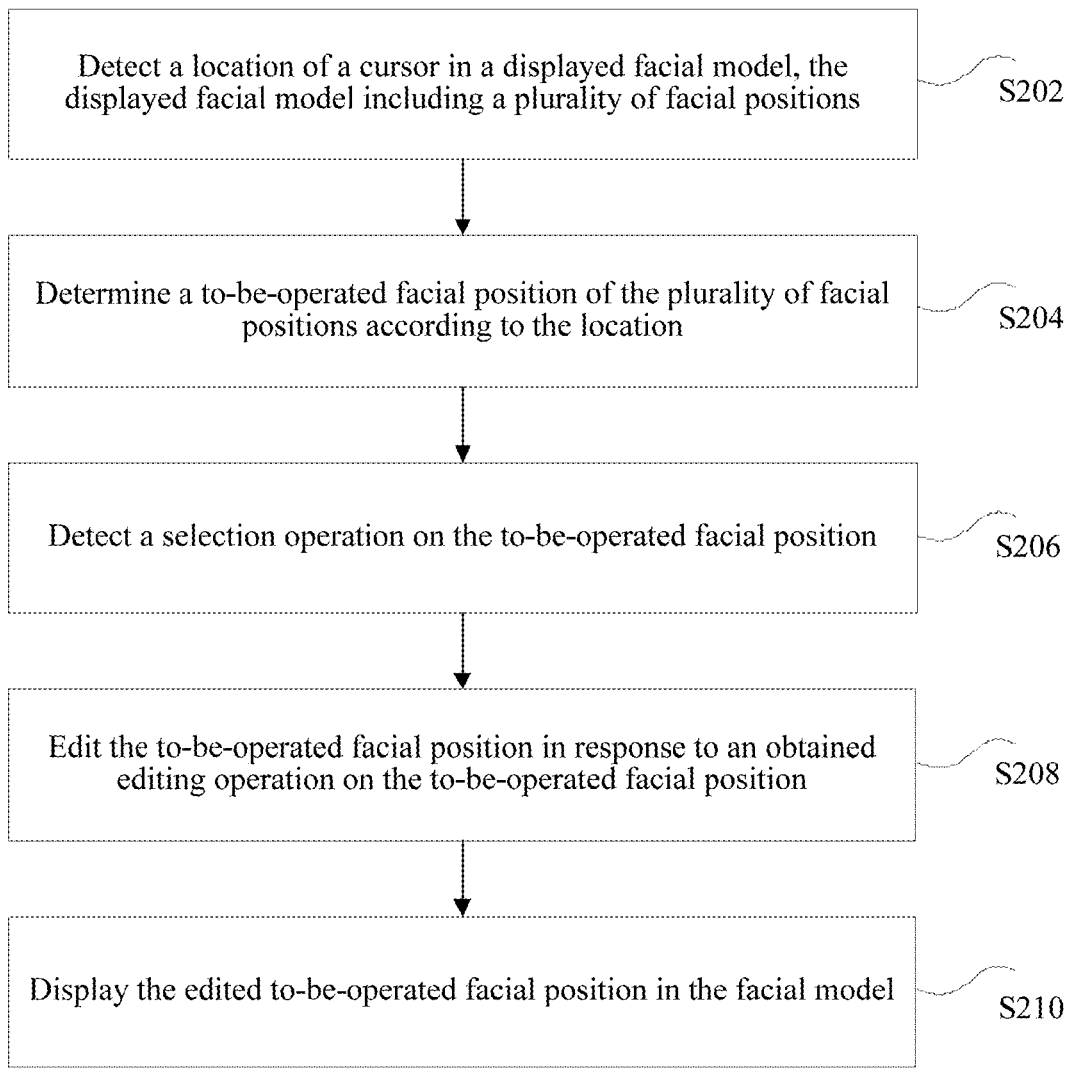
FIG. 2 is a flowchart of a facial model editing method according to an embodiment of the present disclosure.

According to an embodiment of the present disclosure, a facial model editing method is provided. As shown in FIG. 2, the method includes the followings.

S202. Detecting a location of a cursor in a displayed facial model, the displayed facial model including a plurality of facial positions.

S204. Determining a to-be-operated facial position from the plurality of facial positions according to the location detected.

S206. Detecting a selection operation on the to-be-operated facial position.

S208. Editing the to-be-operated facial position in response to an obtained editing operation on the to-be-operated facial position.

S210. Displaying the edited to-be-operated facial position in the facial model.

In one embodiment, the facial model editing method may be applied to editing a corresponding facial model for a character role in a character-role creating process in a terminal application. For example, using a game application as an example, when a character role in the game application is created for a player, a to-be-operated facial position may be determined by detecting locations of a cursor in a plurality of facial positions of a displayed facial model, and after a selection operation on the to-be-operated facial position is detected, a corresponding editing operation is performed in response to the obtained editing operation.

Figure 3:
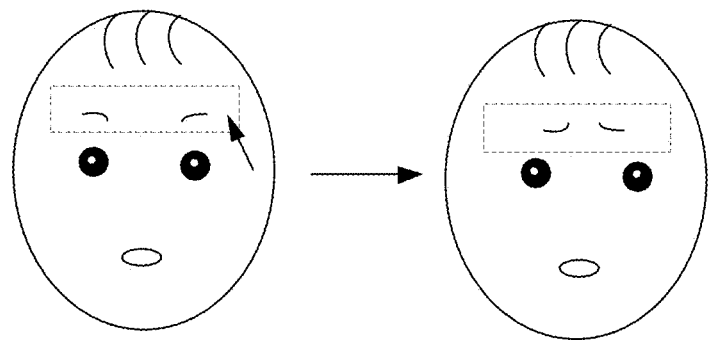
FIG. 3 is a schematic diagram of application of a facial model editing method according to an embodiment of the present disclosure.

FIG. 3 is a schematic diagram of application of a facial model editing method according to an embodiment of the present disclosure. As shown in FIG. 3, an eyebrow position (such as a dashed line frame shown on the left of FIG. 3) in a facial model is selected by using a location of a cursor. After an editing operation (such as a rotation operation) on the position is obtained, the eyebrow position may be edited, and the edited eyebrow position (such as a dashed line frame shown on the right of FIG. 3) is displayed in the facial model. Therefore, an editing operation on a facial model of a character role is simplified, and an edited character role is displayed rapidly and accurately for a player. The illustration is only an example, and the facial model editing method described in one embodiment is applicable to any type of terminal application, and the selection may be performed by any appropriate methods in addition to using a cursor.

In one embodiment, according to the location of the cursor detected in the facial model displayed on a terminal, a to-be-operated facial position of a plurality of facial positions of the facial model is determined and, after a selection operation on the to-be-operated facial position is detected, the to-be-operated facial position is edited in response to an obtained editing operation on the to-be-operated facial position, so as to display the edited to-be-operated facial position in the facial model. That is, by detecting the location of the cursor, the to-be-operated facial position selected from the plurality of facial positions of the facial model is determined, so as to directly complete an editing process for the to-be-operated facial position, and a sliding block corresponding to the to-be-operated facial position does not need to be dragged in an additional control list. Therefore, a user may directly perform facial picking editing on the facial model, thereby simplifying the editing operation on the facial model, and then overcoming the problem of relatively high operation complexity caused by switching between the facial model and the sliding block in the control list. Further, the editing operation is directly performed on the facial position in the facial model, so that the user may intuitively see the editing operation displayed in the terminal and a changing effect of the edited to-be-operated facial position, to implement what-you-see-is-what-you-get. Therefore, the editing operation can better meet user requirements.

In one embodiment, the location of the cursor may be used to indicate a corresponding location of a mouse displayed on a terminal screen.

In one embodiment, when the selection operation on the to-be-operated facial position is detected, the method may include: specially displaying the to-be-operated facial position. For example, the facial position is highlighted, or a shadow is displayed on the facial position.

In one embodiment, the editing may include at least one of the followings: moving the to-be-operated facial position; rotating the to-be-operated facial position; enlarging the to-be-operated facial position; and diminishing the to-be-operated facial position.

In one embodiment, the process of determining the to-be-operated facial position of the plurality of facial positions according to the location of the cursor includes: obtaining a color value of a pixel or pixels of the location; and determining the to-be-operated facial position of the plurality of facial positions and corresponding to the color value.

In one embodiment, the process of obtaining a color value of a pixel on the location may include: obtaining from a mask map the color value of the pixel corresponding to the location, where the mask map is laminated over the facial model, the mask map includes a plurality of mask areas in a one-to-one correspondence with the plurality of facial positions, and each mask area corresponds to one facial position. The color value of the pixel may include one of the following: a red color value of the pixel, a green color value of the pixel, and a blue color value of the pixel.

In one embodiment, each mask area on the mask map laminated over the facial model corresponds to one facial position on the facial model. That is, when a mask area on the mask map laminated over the facial model is selected by using the cursor, a corresponding facial position in the facial model may be selected, thereby directly editing the facial position on the facial model, and simplifying the editing operation.

For example, in one embodiment, the mask map may be constructed by using the following code:

```
float4 maskColor = tex2D(FacialMaskSampler,param.uv0);
float maskR = maskColor.r*255.0f;
float alpha = 0;
if(IsValEqual(SelectedAreaColor, maskR))
{
    alpha += FacialMaskParams.y;
}
float4 finalColor = float4(0,2,5,alpha*2.5f*maskColor.b);
where maskColor.r is used to indicate a red channel, and maskColor.b is used to indicate a blue channel.
```

Moreover, in one embodiment, a mapping relationship between each mask area in the mask map and a color value of a corresponding pixel may be preset.

TABLE 1

| Location in facial model | Subdivision position name | R color value |
|---|---|---|
| Nose | Entire nose | 230 |
|  | Nasal root | 210 |
|  | Nasal bridge | 200 |
|  | Nasal tip | 190 |
|  | Nasal base | 180 |
|  | Nasal base | 180 |

For example, a nose in a facial model shown in Table 1 specifically includes 6 positions, one red color value (indicated by using an R color value) is set for each position, and to avoid errors, for example, values may differ but is not limited to differing from each other by at least 10 units.

That is, the process of determining the to-be-operated facial position of the plurality of facial positions and corresponding to the color value may include: after the color value of the pixel corresponding to the location and in the mask map is obtained, a mask area corresponding to the color value of the pixel may be obtained by querying the mapping relationship, and then a to-be-operated facial position corresponding to the mask area is obtained.

In one embodiment, the location of the cursor in the displayed facial model may be detected by using a facial picking technology for pixel picking. The pixel picking is a picking technology in which a model object is used as a unit, and is a method in which a virtual object selected or clicked by a cursor on a display screen is detected and the cursor interacts with the virtual object. The virtual object may be a facial position in a corresponding facial model.

In one embodiment, an identifier ID is set for each virtual object (that is, facial position), and then all pickable virtual objects are drawn on a render target, where the ID is introduced by a constant register. Finally, an ID of a position of a current location of the cursor may be obtained by using GetRenderTarget( ) (i.e., a function in Direct3D).

In one embodiment, before the detecting the location of the cursor in the displayed facial model, the method may further include: displaying the facial model and the generated mask map, where the mask map is set to be laminated over the facial model. A process of obtaining the facial model may be as follows.

A facial picking system is actually a picking method sensitive to a map color, which may be implemented by using the following HLSL code:

```
result.color0=tex2D(FacialMaskSampler,param.uv0);
result.color0.gb= param.uv0.xy;
floatdepth=EncodeFloatToRGBA8(param.homoDepth.x/param.homoDepth.y);
result.color1 =float4(1.0f, 1.0f, 0, depth); //magic code marking for facial model map
```

The facial model displayed on the screen is obtained by using the following code:

```
tex2D(FacialMaskSampler,param.uv0);
result.color1 =float4(1.0f, 1.0f, 0, depth).
```

One verification code is set for each pixel in the screen, and whether the pixel belongs to the facial model is verified by using the verification code. Only a pixel (equal to (1.0,1.0,0)) conforming to a verification code is processed according to the facial model:

```
EncodingColorData(queryData,maskCode);
If(maskCode.r==0xff && maskCode.g==0xff && maskCode.b==0)
{
    mDepthSelted=maskCode.a;
    mIsPickingVaild=true;
}
```

By detecting the location of the cursor on the screen, and a current resolution of the screen, a pixel selected by the user at the location of the cursor is calculated.

In one embodiment provided in the present disclosure, according to a location of a cursor detected in a facial model displayed on a terminal, a to-be-operated facial position of a plurality of facial positions of the facial model is determined and, after a selection operation on the to-be-operated facial position is detected, the to-be-operated facial position is edited in response to an obtained editing operation on the to-be-operated facial position, so as to display the edited to-be-operated facial position in the facial model. That is, by detecting the location of the cursor, the to-be-operated facial position selected from the plurality of facial positions of the facial model is determined, so as to directly complete an editing process for the to-be-operated facial position, and a sliding block corresponding to the to-be-operated facial position does not need to be dragged in an additional control list. Therefore, a user may directly perform facial picking editing on the facial model, thereby simplifying the editing operation on the facial model, and then overcoming a problem of relatively high operation complexity caused by switching between the facial model and the sliding block in the control list.

In one embodiment of the present disclosure, the process of determining a to-be-operated facial position of the plurality of facial positions according to the location includes: obtaining a color value of a pixel on the location; and determining the to-be-operated facial position of the plurality of facial positions and corresponding to the color value.

In one embodiment, the color value of the pixel may be a color value of a pixel corresponding to the location of the cursor and in the mask map. The mask map is laminated over the facial model, the mask map includes a plurality of mask areas in a one-to-one correspondence with a plurality of facial positions, and each mask area corresponds to one facial position.

In one embodiment, a color value of a pixel corresponding to a location of the cursor and in the mask map may include a color value of a red channel and a color value of a blue channel. The color value of the pixel may include one of the following: a red color value of the pixel, a green color value of the pixel, and a blue color value of the pixel.

Figure 4:
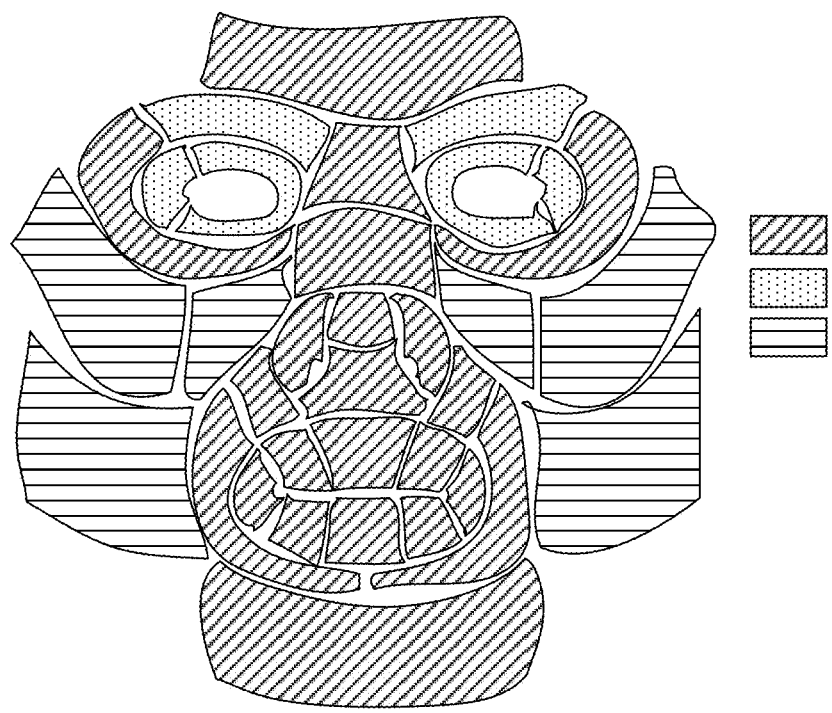
FIG. 4 is a schematic diagram of application of another facial model editing method according to an embodiment of the present disclosure.
Figure 5:
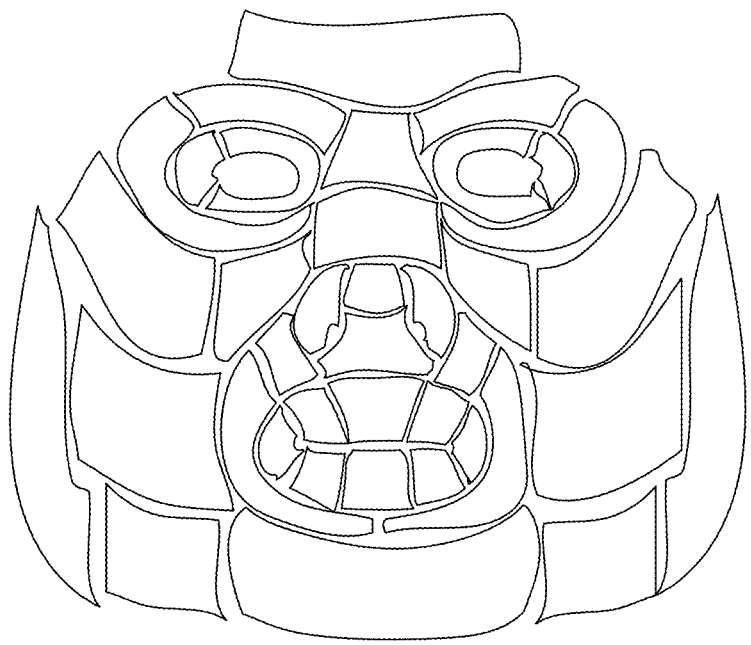
FIG. 5 is a schematic diagram of application of another facial model editing method according to an embodiment of the present disclosure.

In one embodiment, a face formed by a color value of a red channel may be shown in FIG. 4 (an image should be displayed in red), different shadows indicate different levels of red, a color of a left-hand twill filling area is more bright than a color of a wave point filling area, and the color of the wave point filling area is more bright than a color of a cross twill filling area. A face formed by a color value of a blue channel may be shown in FIG. 5 (an image should be displayed in blue).

In one embodiment, a mapping relationship between each mask area in the mask map and a color value of a corresponding pixel may be preset. Therefore, by using a color value of a pixel of a location of the cursor, a mask area corresponding to the color value and in the facial model is determined, and then a to-be-operated facial position of a plurality of facial positions is determined.

For example, with reference to Table 1, when an obtained R color value of a pixel on a location of the cursor is 200, a corresponding mask area may be determined by searching the preset mapping relationship, and then an obtained to-be-operated facial position corresponding to the mask area is "nasal bridge".

In one embodiment provided in the present disclosure, by using an obtained color value of a pixel on a location of the cursor, a to-be-operated facial position corresponding to the color value and of a plurality of facial positions is determined. That is, a to-be-operated facial position is determined by using a color value of a pixel on a location of the cursor, thereby directly performing an editing operation on the facial position in the facial model, so as to simplify the editing operation.

In one embodiment of the present disclosure, the process of obtaining a color value of a pixel on the location includes: obtaining the color value of the pixel corresponding to the location and in a mask map, where the mask map is laminated over the facial model, the mask map includes a plurality of mask areas in a one-to-one correspondence with the plurality of facial positions, and each mask area corresponds to one facial position. The color value of the pixel includes one of the following: a red color value of the pixel, a green color value of the pixel, and a blue color value of the pixel.

Specifically, description is made with reference to the following example. According to human anatomy, one muscle position control list is obtained according to classes of muscles that 48 bones can affect, and one red color value (indicated by using an R color value) is set for each position. To avoid errors, values differ from each other by at least 10 units. Further, according to a distribution situation of these positions on the face, a mask map corresponding to the facial model may be obtained by using color values of pixels corresponding to these positions, as shown in Table 2 (some positions):

TABLE 2

| Location in facial model | Subdivision position name | R color value |
| --- | --- | --- |
| Nose | Entire nose | 230 |
|  | Nasal root | 210 |
|  | Nasal bridge | 200 |
|  | Nasal tip | 190 |
|  | Nasal base | 180 |
|  | Nasal wing | 170 |
| Lip | Middle of upper lip | 160 |
|  | Two sides of upper lip | 150 |
|  | Mouth corner | 140 |
|  | Middle of lower lip | 130 |
|  | Two sides of lower lip | 120 |
| Eye | Eyebrow head | 100 |
|  | Eyebrow tail | 90 |
|  | Upper eyelid | 80 |
|  | Inner eye corner | 70 |
|  | Lower eyelid | 60 |
|  | Outer eye corner | 50 |

That is, a mask map corresponding to the facial model may be drawn according to a color value of a pixel in the mapping relationship, the mask map is laminated over the facial model, and a plurality of mask areas included in the mask map is in a one-to-one correspondence with a plurality of facial positions.

In one embodiment provided in the present disclosure, a color value of a corresponding pixel is obtained by using a mask map laminated over the facial model, thereby accurately obtaining a color value of a pixel on a location of the cursor, so that a corresponding to-be-operated facial position is obtained according to the color value.

In one embodiment of the present disclosure, before the detecting a location of a cursor in a displayed facial model, the method further includes: displaying the facial model and the generated mask map, where the mask map is set to be laminated over the facial model.

Figure 6:
FIG. 6 is a schematic diagram of application of another facial model editing method according to an embodiment of the present disclosure.

Specifically, description is made with reference to the following example. Before the location of the cursor in the displayed facial model is detected, the facial model and the generated mask map that are shown in FIG. 6 are displayed on the terminal screen, where the mask map is set to be laminated over the facial model.

In one embodiment provided in the present disclosure, before the location of the cursor in the displayed facial model is detected, an image obtained by combining the facial model and the generated mask map is displayed in advance, so that when the location of the cursor is detected, a corresponding location may be directly and rapidly obtained by using the mask map, and then a to-be-operated facial position of a plurality of facial positions of the facial model is accurately obtained, so as to improve editing efficiency.

In one embodiment of the present disclosure, when the selection operation on the to-be-operated facial position is detected, the method further includes: highlighting the to-be-operated facial position in the facial model.

In one embodiment, when the selection operation on the to-be-operated facial position is detected, the method may include: specially displaying the to-be-operated facial position. For example, the facial position is highlighted, or a shadow is displayed on the facial position.

In one embodiment provided in the present disclosure, the to-be-operated facial position is highlighted, so that the user can intuitively see an editing operation performed on a facial position in the facial model and a change effect of the edited facial position, to implement what you see is what you get. Therefore, the editing operation can better meet user requirements.

In one embodiment of the present disclosure, the editing the to-be-operated facial position in response to an obtained editing operation on the to-be-operated facial position includes at least one of the following: moving the to-be-operated facial position; rotating the to-be-operated facial position; enlarging the to-be-operated facial position; and diminishing the to-be-operated facial position.

In one embodiment, an operation manner of implementing the editing may be at least one of the following: clicking and dragging. That is, at least one of the following editing operations: moving, rotating, enlarging, and diminishing may be performed on the to-be-operated facial position by using a combination of different operation manners.

For example, as shown in FIG. 3, when a to-be-operated position is selected by means of click, and editing operations such as rotating, diminishing, and moving are performed on the to-be-operated position, a process of editing content shown from the left of FIG. 3 to the right of FIG. 3 may be implemented.

In one embodiment provided in the present disclosure, different editing operations are performed on the to-be-operated facial position directly on the facial model, thereby simplifying the editing operation, improving editing efficiency, and overcoming a problem of relatively high operation complexity in the prior art.

The foregoing method embodiments are expressed as a series of action combinations for the purpose of brief description, but a person of ordinary skill in the art should know that because some steps may be performed in other sequences or simultaneously according to the present disclosure, the present disclosure is not limited to a described action sequence. In addition, a person skilled in the art should also know that all the embodiments described in this specification are examples, and the related actions and modules are not necessarily required in the present disclosure.

Through the descriptions of the preceding embodiments, a person skilled in the art may understand that the methods according to the foregoing embodiments may be implemented by hardware only or by software and a necessary hardware platform. Based on such an understanding, the technical solutions of the present disclosure may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the methods described in the embodiments of the present disclosure.

Figure 7:
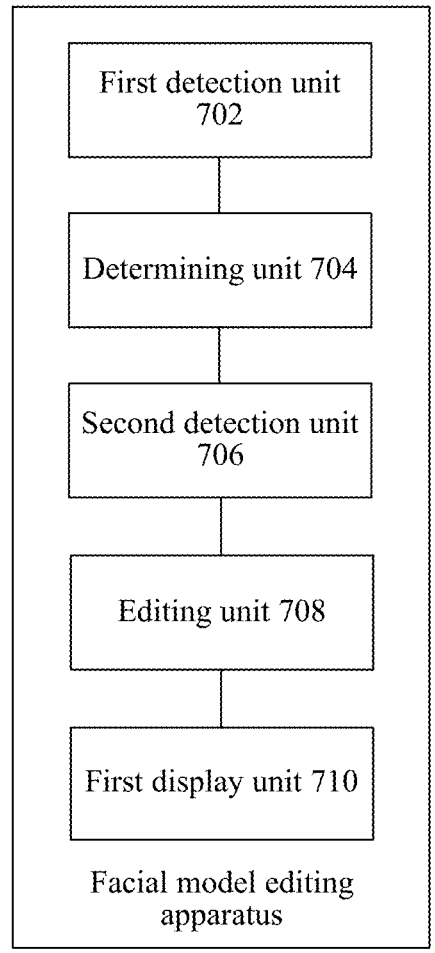
FIG. 7 is a schematic structural diagram of a facial model editing apparatus according to an embodiment of the present disclosure.

According to an embodiment of the present disclosure, a facial model editing apparatus configured to implement the facial model editing method is further provided. As shown in FIG. 7, the apparatus includes: a first detection unit 702, a determining unit 704, a second detection unit 706, an editing unit 708, and a first display unit 710.

The first detection unit 702 is configured to detect a location of a cursor in a displayed facial model, the displayed facial model including a plurality of facial positions. The determining unit 704 is configured to determine a to-be-operated facial position of the plurality of facial positions according to the location. The second detection unit 706 is configured to detect a selection operation on the to-be-operated facial position. The editing unit 708 is configured to edit the to-be-operated facial position in response to an obtained editing operation on the to-be-operated facial position. The first display unit 710 is configured to display the edited to-be-operated facial position in the facial model.

In one embodiment, the facial model editing apparatus may be applied to editing a corresponding facial model for a character role in a character role creating process in a terminal application. For example, using a game application as an example, when a character role in the game application is created for a player, a to-be-operated facial position may be determined by detecting locations of a cursor in a plurality of facial positions of a displayed facial model, and after a selection operation on the to-be-operated facial position is detected, a corresponding editing operation is performed in response to the obtained editing operation.

As shown in FIG. 3, an eyebrow position (such as a dashed line frame shown on the left of FIG. 3) in a facial model is selected by using a location of a cursor. After an editing operation (such as a rotation operation) on the position is obtained, the eyebrow position may be edited, and the edited eyebrow position (such as a dashed line frame shown on the right of FIG. 3) is displayed in the facial model. Therefore, an editing operation on a facial model of a character role is simplified, and an edited character role is displayed rapidly and accurately for a player. The illustration is only an example, and the facial model editing apparatus described in one embodiment is applicable to any type of terminal application.

In one embodiment, according to a location of a cursor detected in a facial model displayed in a terminal, a to-be-operated facial position of a plurality of facial positions of the facial model is determined, and after a selection operation on the to-be-operated facial position is detected, the to-be-operated facial position is edited in response to an obtained editing operation on the to-be-operated facial position, so as to display the edited to-be-operated facial position in the facial model. That is, by detecting the location of the cursor, the to-be-operated facial position selected from the plurality of facial positions of the facial model is determined, so as to directly complete an editing process for the to-be-operated facial position, and a sliding block corresponding to the to-be-operated facial position does not need to be dragged in an additional control list. Therefore, a user may directly perform facial picking editing on the facial model, thereby simplifying the editing operation on the facial model, overcoming the problem of relatively high operation complexity caused by switching between the facial model and the sliding block in the control list. Further, the editing operation is directly performed on the facial position in the facial model, so that the user may intuitionally see the editing operation displayed in the terminal and a change effect of the edited to-be-operated facial position, to implement what-you-see-is-what-you-get. Therefore, the editing operation can better meet user requirements, so as to improve user experience.

In one embodiment, the location of the cursor may be used to indicate a corresponding location of a mouse displayed on a terminal screen.

In one embodiment, when the selection operation on the to-be-operated facial position is detected, the to-be-operated facial position may be specially displayed. For example, the facial position is highlighted, or a shadow is displayed on the facial position.

In one embodiment, the editing may include at least one of the following: moving the to-be-operated facial position; rotating the to-be-operated facial position; enlarging the to-be-operated facial position; and diminishing the to-be-operated facial position.

In one embodiment, the determining a to-be-operated facial position of the plurality of facial positions according to the location of the cursor includes: obtaining a color value of a pixel on the location; and determining the to-be-operated facial position of the plurality of facial positions and corresponding to the color value.

In one embodiment, the process of obtaining a color value of a pixel on the location may include: obtaining the color value of the pixel corresponding to the location and in a mask map, where the mask map is laminated over the facial model, the mask map includes a plurality of mask areas in a one-to-one correspondence with the plurality of facial positions, and each mask area corresponds to one facial position. The color value of the pixel may include one of the following: a red color value of the pixel, a green color value of the pixel, and a blue color value of the pixel.

In one embodiment, each mask area on the mask map laminated over the facial model corresponds to one facial position on the facial model. That is, when a mask area on the mask map laminated over the facial model is selected by using the cursor, a corresponding facial position in the facial model may be selected, thereby directly editing the facial position on the facial model, and simplifying the editing operation.

Moreover, in one embodiment, a mapping relationship between each mask area in the mask map and a color value of a corresponding pixel may be preset. For example, a nose in a facial model shown in Table 3 specifically includes 6 positions, one red color value (indicated by using an R color value) is set for each position, and to avoid errors, for example, values may differ but is not limited to differing from each other by at least 10 units.

TABLE 3

| Location in facial model | Subdivision position name | R color value |
| --- | --- | --- |
| Nose | Entire nose | 230 |
|  | Nasal root | 210 |
|  | Nasal bridge | 200 |
|  | Nasal tip | 190 |
|  | Nasal base | 180 |
|  | Nasal wing | 170 |

That is, the determining the to-be-operated facial position of the plurality of facial positions and corresponding to the color value may include: after the RGB color value of the pixel corresponding to the location and in the mask map is obtained, a mask area corresponding to the color value of the pixel may be obtained by querying the mapping relationship, and then a to-be-operated facial position corresponding to the mask area is obtained.

In one embodiment, a location of a cursor in a displayed facial model may be detected by using a facial picking technology for pixel picking. The pixel picking is a picking technology in which a model object is used as a unit, and is a method in which a virtual object selected or clicked by a cursor on a display screen is detected and the cursor interacts with the virtual object. The virtual object may be a facial position in a corresponding facial model.

In one embodiment, one identifier ID is set for each virtual object (that is, facial position), and then all pickable virtual objects are drawn on one render target, where the ID is introduced by a constant register. Finally, an ID of a position of a current location of the cursor is obtained by using GetRenderTarget( ) (that is, one function in Direct3D).

In one embodiment, before the detecting a location of a cursor in a displayed facial model, the method may further include: displaying the facial model and the generated mask map, where the mask map is set to be laminated over the facial model. A process of obtaining the facial model may be as follows.

A facial picking system is actually a picking method sensitive to a map color, which is implemented by using the following core HLSL code:

```
result.color0=tex2D(FacialMaskSampler,param.uv0);
result.color0.gb= param.uv0.xy;
floatdepth=EncodeFloatToRGBA8(param.homoDepth.x/param.homoDepth.y);
result.color1 =float4(1.0f, 1.0f, 0, depth);//magic code marking for facial model map
```

The facial model displayed on the screen is obtained by using the following code:
tex2D(FacialMaskSampler,param.uv0);
result.color1=float4(1.0f, 1.0f, 0, depth).

One verification code is set for each pixel in the screen, and whether the pixel belongs to the facial model is verified by using the verification code. Only a pixel (equal to (1.0,1.0,0)) conforming to a verification code is processed according to the facial model:

```
            EncodingColorData(queryData,maskCode);
            If(maskCode.r==0xff &&
               maskCode.g==0xff &&
               maskCode.b==0)
    {
               mDepthSelted=maskCode.a;
               mIsPickingVaild=true;
    }
```

By detecting the location of the cursor on the screen, and a current resolution of the screen, a pixel selected by the user at the location of the cursor is calculated.

In one embodiment provided in the present disclosure, according to a location of a cursor detected in a facial model displayed in a terminal, a to-be-operated facial position of a plurality of facial positions of the facial model is determined, and after a selection operation on the to-be-operated facial position is detected, the to-be-operated facial position is edited in response to an obtained editing operation on the to-be-operated facial position, so as to display the edited to-be-operated facial position in the facial model. That is, by detecting the location of the cursor, the to-be-operated facial position selected from the plurality of facial positions of the facial model is determined, so as to directly complete an editing process for the to-be-operated facial position, and a sliding block corresponding to the to-be-operated facial position does not need to be dragged in an additional control list. Therefore, a user may directly perform facial picking editing on the facial model, thereby simplifying the editing operation on the facial model, and then overcoming a problem of relatively high operation complexity caused by switching between the facial model and the sliding block in the control list.

In one embodiment of the present disclosure, the determining unit includes an obtaining module and a determining module. The obtaining module is configured to obtain a color value of a pixel on the location. The determining module is configured to determine the to-be-operated facial position of the plurality of facial positions and corresponding to the color value.

In one embodiment, the color value of the pixel may be a color value of a pixel corresponding to a location of the cursor and in the mask map. The mask map is laminated over the facial model, the mask map includes a plurality of mask areas in a one-to-one correspondence with a plurality of facial positions, and each mask area corresponds to one facial position.

In one embodiment, a color value of a pixel corresponding to a location of the cursor and in the mask map may include a color value of a red channel and a color value of a blue channel. The color value of the pixel may include one of the following: a red color value of the pixel, a green color value of the pixel, and a blue color value of the pixel.

In one embodiment, a face formed by a color value of a red channel may be shown in FIG. 4 (an image should be displayed in red), different shadows indicate different levels of red, a color of a left-hand twill filling area is than more bright a color of a wave point filling area, and the color of the wave point filling area is more bright than a color of a cross twill filling area. A face formed by a color value of a blue channel may be shown in FIG. 5 (an image should be displayed in blue).

In one embodiment, a mapping relationship between each mask area in the mask map and a color value of a corresponding pixel may be preset. Therefore, by using a color value of a pixel of a location of the cursor, a mask area corresponding to the color value and in the facial model is determined, and then a to-be-operated facial position of a plurality of facial positions is determined.

For example, with reference to Table 3, when an obtained R color value of a pixel on a location of the cursor is 200, a corresponding mask area may be determined by searching the preset mapping relationship, and then an obtained to-be-operated facial position corresponding to the mask area is "nasal bridge".

In one embodiment provided in the present disclosure, by using an obtained color value of a pixel on a location of the cursor, a to-be-operated facial position corresponding to the color value and of a plurality of facial positions is determined. That is, a to-be-operated facial position is determined by using a color value of a pixel on a location of the cursor, thereby directly performing an editing operation on the facial position in the facial model, so as to simplify the editing operation.

In one embodiment of the present disclosure, the obtaining module includes an obtaining sub-module. The obtaining sub-module is configured to obtain the color value of the pixel corresponding to the location and in a mask map, where the mask map is laminated over the facial model, the mask map includes a plurality of mask areas in a one-to-one correspondence with the plurality of facial positions, and each mask area corresponds to one facial position. The color value of the pixel includes one of the following: a red color value of the pixel, a green color value of the pixel, and a blue color value of the pixel.

Specifically, description is made with reference to the following example. According to human anatomy, one muscle position control list is obtained according to classes of muscles that 48 bones can affect, and one red color value (indicated by using an R color value) is set for each position. To avoid errors, values differ from each other by at least 10 units. Further, according to a distribution situation of these positions on the face, a mask map corresponding to the facial model may be obtained by using color values of pixels corresponding to these positions, as shown in Table 4 (some positions):

TABLE 4

| Location in facial model | Subdivision position name | R color value |
| --- | --- | --- |
| Nose | Entire nose | 230 |
|  | Nasal root | 210 |
|  | Nasal bridge | 200 |
|  | Nasal tip | 190 |
|  | Nasal base | 180 |
|  | Nasal wing | 170 |
| Lip | Middle of upper lip | 160 |
|  | Two sides of upper lip | 150 |
|  | Mouth corner | 140 |
|  | Middle of lower lip | 130 |
|  | Two sides of lower lip | 120 |
| Eye | Eyebrow head | 100 |
|  | Eyebrow tail | 90 |
|  | Upper eyelid | 80 |
|  | Inner eye corner | 70 |
|  | Lower eyelid | 60 |
|  | Outer eye corner | 50 |

That is, a mask map corresponding to the facial model may be drawn according to a color value of a pixel in the mapping relationship, the mask map is laminated over the facial model, and a plurality of mask areas included in the mask map is in a one-to-one correspondence with a plurality of facial positions.

In one embodiment provided in the present disclosure, a color value of a corresponding pixel is obtained by using a mask map laminated over the facial model, thereby accurately obtaining a color value of a pixel on a location of the cursor, so that a corresponding to-be-operated facial position is obtained according to the color value.

In one embodiment of the present disclosure, the apparatus further includes a second display unit. The second display unit is configured to display the facial model and the generated mask map before the location of the cursor in the displayed facial model is detected, where the mask map is set to be laminated over the facial model.

Specifically, description is made with reference to the following example. Before the location of the cursor in the displayed facial model is detected, the facial model and the generated mask map that are shown in FIG. 6 are displayed on the terminal screen, where the mask map is set to be laminated over the facial model.

In one embodiment provided in the present disclosure, before the location of the cursor in the displayed facial model is detected, an image obtained by combining the facial model and the generated mask map is displayed in advance, so that when the location of the cursor is detected, a corresponding location may be directly and rapidly obtained by using the mask map, and then a to-be-operated facial position of a plurality of facial positions of the facial model is accurately obtained, so as to improve editing efficiency.

In one embodiment of the present disclosure, the apparatus further includes a third display unit. The third display unit is configured to highlight the to-be-operated facial position in the facial model when the selection operation on the to-be-operated facial position is detected.

In one embodiment, when the selection operation on the to-be-operated facial position is detected, the to-be-operated facial position may be specially displayed. For example, the facial position is highlighted, or a shadow is displayed on the facial position.

In one embodiment provided in the present disclosure, the to-be-operated facial position is highlighted, so that the user can intuitionally see an editing operation performed on a facial position in the facial model and a change effect of the edited facial position, to implement what-you-see-is-what-you-get. Therefore, the editing operation can better meet user requirements, so as to improve user experience.

In one embodiment of the present disclosure, the editing unit includes at least one of the following: a first editing module, a second editing module, a third editing module, and a fourth editing module.

The first editing module is configured to move the to-be-operated facial position. The second editing module is configured to rotate the to-be-operated facial position. The third editing module is configured to enlarge the to-be-operated facial position. The fourth editing module is configured to diminish the to-be-operated facial position.

In one embodiment, an operation manner of implementing the editing may be at least one of the following: clicking and dragging. That is, at least one of the following editing operations: moving, rotating, enlarging, and diminishing may be performed on the to-be-operated facial position by using a combination of different operation manners.

For example, as shown in FIG. 3, when a to-be-operated position is selected by means of click, and editing operations such as rotating, diminishing, and moving are performed on the to-be-operated position, a process of editing content shown from the left of FIG. 3 to the right of FIG. 3 may be implemented.

In one embodiment provided in the present disclosure, different editing operations are performed on the to-be-operated facial position directly on the facial model, thereby simplifying the editing operation, improving editing efficiency, and overcoming a problem of relatively high operation complexity in the prior art.

Figure 8:
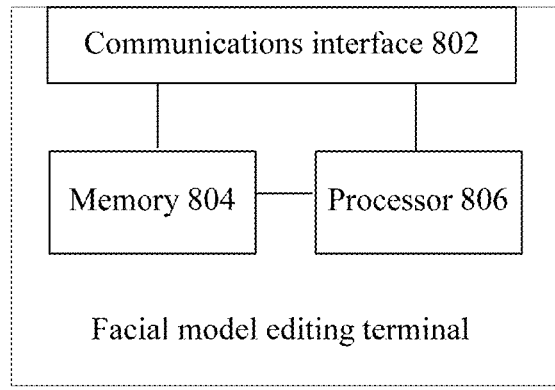
FIG. 8 is a schematic structural diagram of hardware of a facial model editing terminal according to an embodiment of the present disclosure.

According to an embodiment of the present disclosure, a facial model editing terminal configured to implement the facial model editing method is further provided. As shown in FIG. 8, the terminal includes a communications interface 802, a memory 804, and a processor 806.

The communications interface 802 is configured to obtain a facial model, where the facial model includes a plurality of facial positions. The memory 804 is connected to the communications interface 802, and is configured to store the facial model. The processor 806 is connected to the communications interface 802 and the memory 804, and is configured to detect a location of a cursor in the displayed facial model. Further, the processor 806 is configured to determine a to-be-operated facial position of the plurality of facial positions according to the location; further configured to detect a selection operation on the to-be-operated facial position; further configured to edit the to-be-operated facial position in response to an obtained editing operation on the to-be-operated facial position; and further configured to display the edited to-be-operated facial position in the facial model.

In one embodiment of the present disclosure, the memory 804 may be a non-volatile computer readable storage medium is configured to store machine readable instructions, including a first detection instruction, a determining instruction, a second detection instruction, an editing instruction, and a first display instruction. In another embodiment of the present disclosure, the machine-readable instructions further include a second display instruction and a third display instruction.

The processor 806 is configured to read the machine-readable instructions stored in the memory 804, so as to implement the facial model editing method and functions of units in the facial model editing apparatus in the embodiments.

a UV space, and the editing method is applied to a facial area obtained after the trimming, so as to build different facial models, for example, to design a plurality of styles of eye makeup for an eye position obtained after the trimming. In this way, as shown in FIG. 9, when a facial form of a game character is constructed, different makeup looks may be selected for local position areas on a facial basis map (as shown on the right of FIG. 9).

Figure 9:
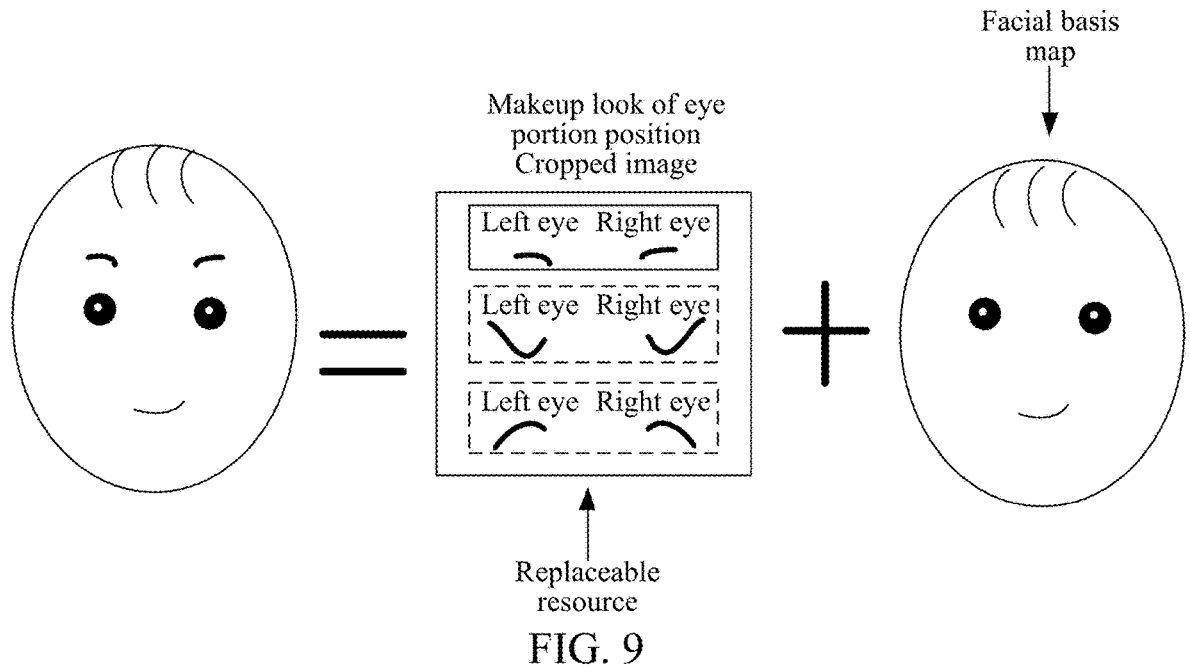
FIG. 9 is a schematic diagram of application of another facial model editing method according to an embodiment of the present disclosure.

For example, replaceable resources provided are selected: makeup look cropped images (as shown in the middle of FIG. 9) of an eye portion position (shown as an eyebrow in FIG. 9) are selected. If a makeup look shown in a solid line frame is selected, a final facial form of the game character may be obtained, as shown on the left of FIG. 9. By using the method provided in the embodiments of the present disclosure, a makeup look of a game character may be more diversified, so as to enrich a role form of the game character.

A specific process of obtaining a cropped image of a local position area may be as follows:

effective parts in DiffuseMap, SpecularMap, and NormalMap are trimmed according to a size of 2 to the power of N (16*16, 32*32, 32*64, 64*128), and coordinate locations are recorded;

```
registry configuration:
    mMakeupID ="171" (fine art resource ID of makeup look)
    <mTexSizeBias v="512"/> <mTexSizeBias v="128"/> (map size of trimming)
    <mTexSizeBias v="512" <mTexSizeBias v="436" (index location of the map in a
map of an original size)
```

The registry configuration may be specifically:

```
    <mFacialMakeupParts mMakeupID ="171" mMakeupID ="EMP_Eyebrow"
mSexualType ="1" mDiffuseFilePath ="F_Eyebrow_0001_D.dds" mSpecFilePath
="F_Eyebrow_0001_S.dds" mNormalFilePath ="F_Eyebrow_0001_N.dds"
mIconImage="F_Eyebrow_0001">
        <mTexSizeBias IsStaticArray ="1" ArrayCount ="4" [XlsProp] ="0">
        <mTexSizeBias v ="512"/>
        <mTexSizeBias v ="128"/>
        <mTexSizeBias v ="512"/>
        <mTexSizeBias v ="436"/>
        </mTexSizeBias>
        </mFacialMakeupParts>
```

For a specific example in one embodiment, refer to examples described in the embodiments of the facial model editing method and apparatus.

One embodiment of the present disclosure provides an application scenario used to implement the facial model editing method, and the application environment of the embodiment is the same as those of the embodiments of the facial model editing method and apparatus.

In one embodiment, the facial model editing method may be applied to a makeup process of a face of a game character, or a cosmetic process of a face of a game character. For example, to make a face of a game character more exquisite and beautiful, a face of a game character may be edited by using the facial model editing method provided in the embodiments, thereby improving facial fineness of a game character displayed in a client application.

Figure 10:
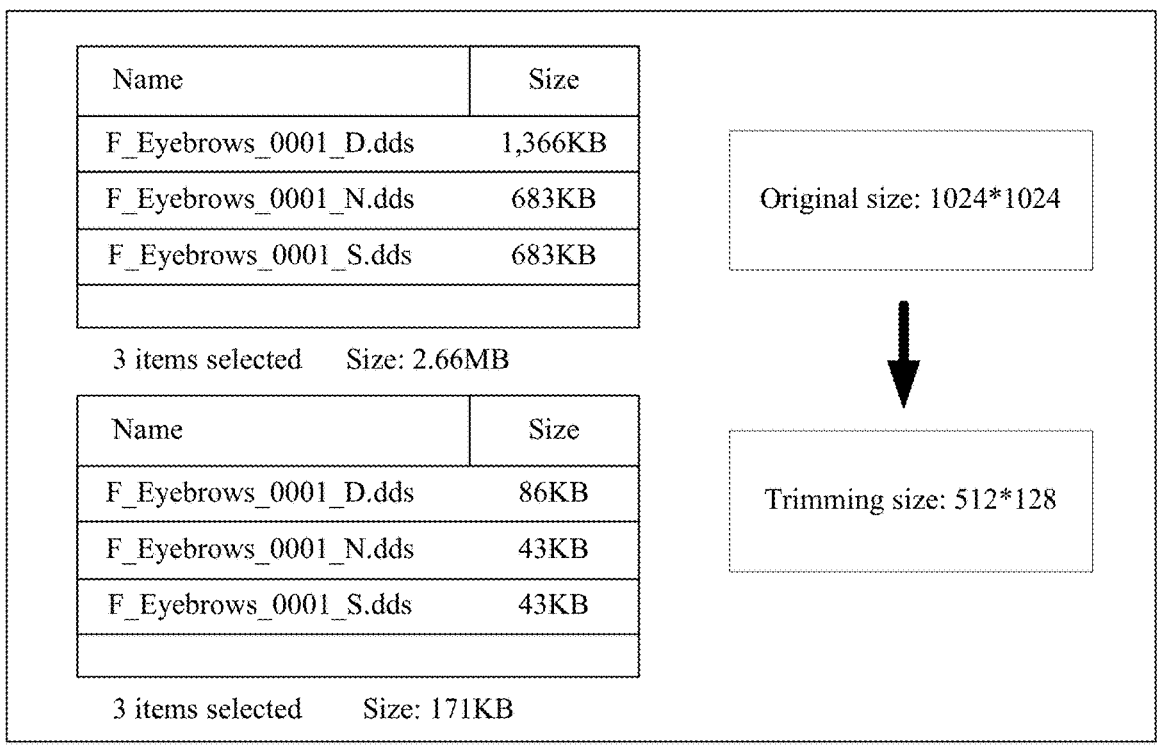
FIG. 10 is a schematic diagram of application of another facial model editing method according to an embodiment of the present disclosure.

In one embodiment of the present disclosure, an example in which the facial model editing method is applied to a makeup process of a face of a game character is used. For example, an effective part of a game character is trimmed in For example, as shown in FIG. 10, after a trimmed object is selected as an eye portion position (such as eyebrow), corresponding content in DiffuseMap, SpecularMap, and NormalMap is trimmed, and content whose original size is 1024*1024 is trimmed into content whose trimming size is 512*128.

Figure 11:
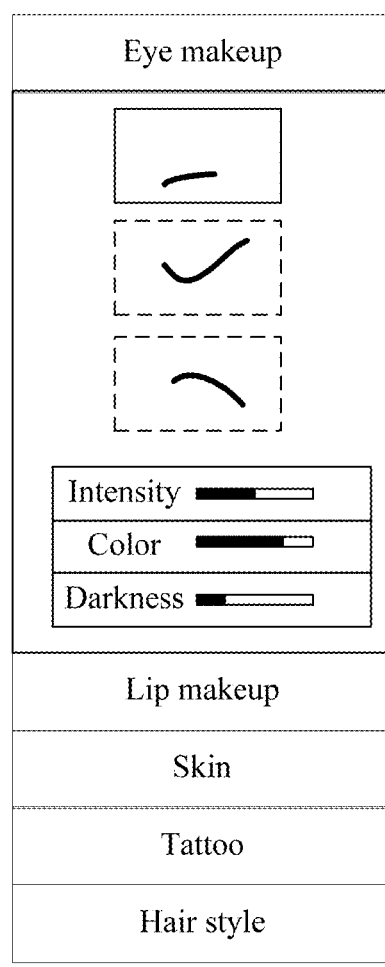
FIG. 11 is a schematic diagram of application of another facial model editing method according to an embodiment of the present disclosure.

Further, in a process of constructing a game character after different cropped images of local position areas are obtained through trimming, a needed cropped image may be directly selected by means of clicking to construct a face of the game character. As shown in FIG. 11, each cropped image of content such as "eye makeup", "lip makeup", or "skin" is selected and replaced, so as to obtain a needed facial form.

In the prior art, a face is usually edited in a boring and complex slide bar manner. However, by using the facial editing method provided in one embodiment, not only requirements of different users in a game application can be satisfied, but also in an application running process, it can be ensured that a user implements diversified facial editing smoothly, thereby greatly reducing system consumption, and enriching character roles.

An embodiment of the present disclosure further provides a storage medium, and the storage medium is a non-volatile storage medium. In one embodiment, the storage medium is configured to store program code used to perform the followings: detecting a location of a cursor in a displayed facial model, the displayed facial model including a plurality of facial positions; determining a to-be-operated facial position of the plurality of facial positions according to the location; detecting a selection operation on the to-be-operated facial position; editing the to-be-operated facial position in response to an obtained editing operation on the to-be-operated facial position; and displaying the edited to-be-operated facial position in the facial model.

In one embodiment, the foregoing storage medium may include any medium that can store program code, such as a USB flash drive, a read-only memory (ROM), a random-access memory (RAM), a removable hard disk, a magnetic disk, or an optical disc. For a specific example in one embodiment, refer to the embodiments of the facial model editing method and apparatus.

The sequence numbers of the preceding embodiments of the present disclosure are merely for description purpose and do not indicate the preference of the embodiments.

When the integrated unit in the foregoing embodiment is implemented in a form of a software functional module, the unit may be stored in the foregoing computer-readable storage medium. Based on such an understanding, the technical solutions the present disclosure may be implemented in a form of a software product. The computer software product is stored in a storage medium and includes several instructions for instructing one or more computer devices (which may be a personal computer, a server, a network device, or the like) to perform all or some of the steps of the methods described in the embodiments of the present disclosure.

In the foregoing embodiments of the present disclosure, descriptions of the embodiments have different aspects, and as for parts that are not described in detail in one embodiment, reference can be made to the relevant description of the other embodiments.

In the several embodiments provided in the present application, it should be understood that the disclosed client may be implemented in other manners. The described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units may be integrated into one unit. The integrated unit may be implemented in a form of hardware, or may be implemented in a form of a software functional unit.

The above descriptions are merely examples of the present disclosure, and it should be noted that, a person of ordinary skill in the art may make various improvements and refinements without departing from the spirit of the present disclosure. All such modifications and refinements should also be intended to be covered by the present disclosure.

What is claimed is:

1. A facial model editing method, comprising:
   generating a mask according to a facial model displayed on a screen, the mask including first and second mask areas respectively corresponding to first and second facial positions of the facial model;
   establishing a mask-color map, wherein the mask-color map correlates respectively between the first and second mask areas and first and second pixel color values, wherein the first pixel color value is different than the second pixel color value;
   determining a target pixel color value corresponding to a location of a cursor on the facial model displayed on the screen;
   identifying a target facial position corresponding to the location of the cursor by mapping the target pixel color value to the mask-color map;
   editing the target facial position to obtain an edited target facial position; and
   displaying the edited target facial position on the facial model as displayed on the screen, wherein at least one of the first and second mask areas is of a filling color and is outlined with an outlining color different than the filling color.

2. The method according to claim 1, further comprising:
   highlighting the target facial position in the facial model.

3. The method according to claim 1, wherein editing the target facial position comprises at least one of the following:
   moving the target facial position;
   rotating the target facial position;
   enlarging the target facial position; and
   diminishing the target facial position.

4. The facial model editing method according to claim 1, wherein the first facial position is an entire nose, the second facial position is a nose portion being one of a nasal root, a nasal bridge, a nasal tip, a nasal base, and a nasal wing, and wherein the first pixel color value correlating to the entire nose is greater in value than the second pixel color value correlating to the nose portion.

5. A facial model editing apparatus, comprising: a memory storing computer program instructions; and a processor coupled to the memory and, when executing the computer program instructions, configured to perform:
   generating a mask according to a facial model displayed on a screen, the mask including first and second mask areas respectively corresponding to first and second facial positions of the facial model;
   establishing a mask-color map, wherein the mask-color map correlates respectively between the first and second mask areas and first and second pixel color values, wherein the first pixel color value is different than the second pixel color value;
   determining a target pixel color value corresponding to a location of a cursor on the facial model displayed on the screen;
   identifying a target facial position corresponding to the location of the cursor by mapping the target pixel color value to the mask-color map;

editing the target facial position to obtain an edited target facial position; and displaying the edited target facial position on the facial model as displayed on the screen, wherein at least one of the first and second mask areas is of a filling color and is outlined with an outlining color different than the filling color.

6. The apparatus according to claim 5, wherein the facial model and the mask are displayed before the location of the cursor in the facial model is detected.

7. The apparatus according to claim 5, wherein the processor is further configured to perform:

highlighting the target facial position in the facial model.

8. The apparatus according to claim 5, wherein the processor is further configured to perform at least one of the following:

moving the target facial position;
rotating the target facial position;
enlarging the target facial position; and
diminishing the target facial position.

9. The facial model editing apparatus according to claim 5, wherein the first facial position is an entire nose, the second facial position is a nose portion being one of a nasal root, a nasal bridge, a nasal tip, a nasal base, and a nasal wing, and wherein the first pixel color value correlating to the entire nose is greater in value than the second pixel color value correlating to the nose portion.

10. A non-transitory computer-readable storage medium storing computer program instructions executable by at least one processor to perform:

generating a mask according to a facial model displayed on a screen, the mask including first and second mask areas respectively corresponding to first and second facial positions of the facial model;

establishing a mask-color map, wherein the mask-color map correlates respectively between the first and second mask areas and first and second pixel color values, wherein the first pixel color value is different than the second pixel color value;

determining a target pixel color value corresponding to a location of a cursor on the facial model displayed on the screen;

identifying a target facial position corresponding to the location of the cursor by mapping the target pixel color value to the mask-color map;

editing the target facial position to obtain an edited target facial position; and displaying the edited target facial position on the facial model as displayed on the screen, wherein at least one of the first and second mask areas is of a filling color and is outlined with an outlining color different than the filling color.

11. The non-transitory computer-readable storage medium according to claim 10, wherein the computer program instructions further cause the at least one processor to perform:

displaying the facial model and the mask before the location of the cursor in the facial model is detected.

12. The non-transitory computer-readable storage medium according to claim 10, wherein the computer program instructions further cause the at least one processor to perform:

highlighting the target facial position in the facial model.

13. The non-transitory computer-readable storage medium according to claim 10, wherein editing the target facial position comprises at least one of the following:

moving the target facial position;
rotating the target facial position;
enlarging the target facial position; and
diminishing the target facial position.

14. The non-transitory computer-readable storage medium according to claim 10, wherein the first facial position is an entire nose, the second facial position is a nose portion being one of a nasal root, a nasal bridge, a nasal tip, a nasal base, and a nasal wing, and wherein the first pixel color value correlating to the entire nose is greater in value than the second pixel color value correlating to the nose portion.

* * * * *